United States Patent [19]

Inagaki et al.

[11] Patent Number: 5,022,480
[45] Date of Patent: Jun. 11, 1991

[54] STEERING SAFETY MECHANISM

[75] Inventors: Hidemitsu Inagaki; Mutsumi Kawamoto; Satoru Tanaka, all of Anjo, Japan

[73] Assignee: Aisin AW Co., Ltd., Japan

[21] Appl. No.: 377,061

[22] Filed: Jul. 10, 1989

[30] Foreign Application Priority Data

Oct. 26, 1988 [JP] Japan .................. 63-271904

[51] Int. Cl.⁵ .............................................. B62D 5/04
[52] U.S. Cl. .................................. 180/79.1; 180/141
[58] Field of Search ...................... 180/79.1, 141, 142, 180/143, 79

[56] References Cited

U.S. PATENT DOCUMENTS 4,785,901  11/1988  Maeda ........................... 180/79.1 X

FOREIGN PATENT DOCUMENTS 188751  11/1983  Japan ............................. 180/79.1
60475   3/1989   Japan ............................. 180/79.1

Primary Examiner—Charles A. Marmor
Assistant Examiner—Alan M. Kagen
Attorney, Agent, or Firm—Lorusso & Loud

[57] ABSTRACT

A steering safety mechanism for an automotive vehicle includes a steering shaft, a steering rack for turning a tire in response to rotation of the steering shaft, a steering motor for rotating the steering shaft or oscillating the steering rack leftward and rightward, and an electronic control unit for controlling the motor. The motor is rotated in a direction which limits rotation of the steering shaft in dependence upon vehicle velocity and steering angle, or vehicle velocity alone. This makes it possible to prevent the vehicle from skidding sideways and rolling over when the driver turns the steering wheel too sharply.

15 Claims, 5 Drawing Sheets (a)

(b)

STEERING SAFETY MECHANISM

BACKGROUND OF THE INVENTION

This invention relates to an effective steering safety mechanism which assures safety when the driver of an automotive vehicle turns the steering wheel of the vehicle suddenly and sharply.

In a known conventional power steering system, the force for turning the steering wheel is applied by the driver with an assist from a hydraulic or electric motor. Such a steering system adjusts the amount of power assist for the steering wheel in dependence upon vehicle velocity and steering angle, taking into account both steerability and safety. Power assist is applied for steering at low velocities in order to lighten the load on the driver when the steering wheel is turned. At high velocities, however, the power assist is limited in order to prevent a loss of stability that can be caused by a steering wheel that turns too lightly.

In the conventional power steering system, however, the chief aim is to provide the power assist in order to make it easier for the driver to turn the steering wheel for turns made at low velocity. No consideration is given to restricting steering or to positive application of a restoring force when the vehicle skids sideways due to centrifugal force or when the steering wheel is turned so sharply as to risk overturning the vehicle, both of these possibilities at high traveling velocities.

Recently, electric automobiles have been developed in which the front and rear wheels are capable of being steered up to an angle of 90° by electric motors so that the vehicle can make small turns or travel in translational fashion. When the steering wheel is turned to sharply and suddenly in such a vehicle, there is the danger that the vehicle will skid sideways or roll over unless steering is restricted or a restoring force applied in a positive manner.

SUMMARY OF THE INVENTION

Accordingly, an object of the invention is to provide a steering safety mechanism capable of preventing a vehicle from skidding sideways and from rolling over when the steering wheel of the vehicle is turned too sharply and suddenly by the driver.

According to the present invention, the foregoing object is attained by providing a steering safety mechanism for an automotive vehicle comprising a steering shaft, a steering rack for turning a tire in response to rotation of the steering shaft, a steering motor for rotating the steering shaft or oscillating the steering rack leftward and rightward, and an electronic control unit for controlling the motor, the motor being rotated in a direction which limits rotation of the steering shaft in dependence upon vehicle velocity and steering angle, or vehicle velocity alone.

Means for performing the abovementioned limiting operation mechanically comprises a steering shaft, a steering rack for rotating a tire in response to rotation of the steering shaft, engaging means formed on the rack, and a limiting mechanism engageable with the engaging means. The limiting mechanism includes a rocking lever freely rotatably fitted on a support shaft, a spring provided between the support shaft and the rocking lever, an engaging member provided on the rocking lever and engageable with the engaging means, and a weight provided on the rocking lever.

In accordance with the invention, values of vehicle velocity and steering angle are fed into the electronic control unit which, by relying upon a map, decides a restoring force commensurate with the vehicle velocity and steering angle. The steering motor is driven in accordance with this restoring force to rotate the steering shaft in the direction opposite that in which the steering wheel is turned.

Thus, the invention makes it possible to prevent the vehicle from skidding sideways and rolling over when the driver turns the steering wheel to sharply. The invention is especially effective when applied to an electric automobile of the type in which the front and rear wheels are capable of being steered up to an angle of 90° by electric motors so that the vehicle can make small turns or travel in translational fashion, i.e., sideways.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIGS. 1 through 3 illustrate an embodiment of a steering safety mechanism according to the present invention, in which FIG. 1 is a view showing the overall arrangement of the invention, FIG. 2 is a flowchart for describing the flow of processing in a control system, and FIG. 3 is a view showing an example of a map stored in memory in advance;

DESCRIPTION OF THE PREFERRED EMBODIMENT

Embodiments of the present invention will now be described in detail with reference to the drawings.

Figure 1:
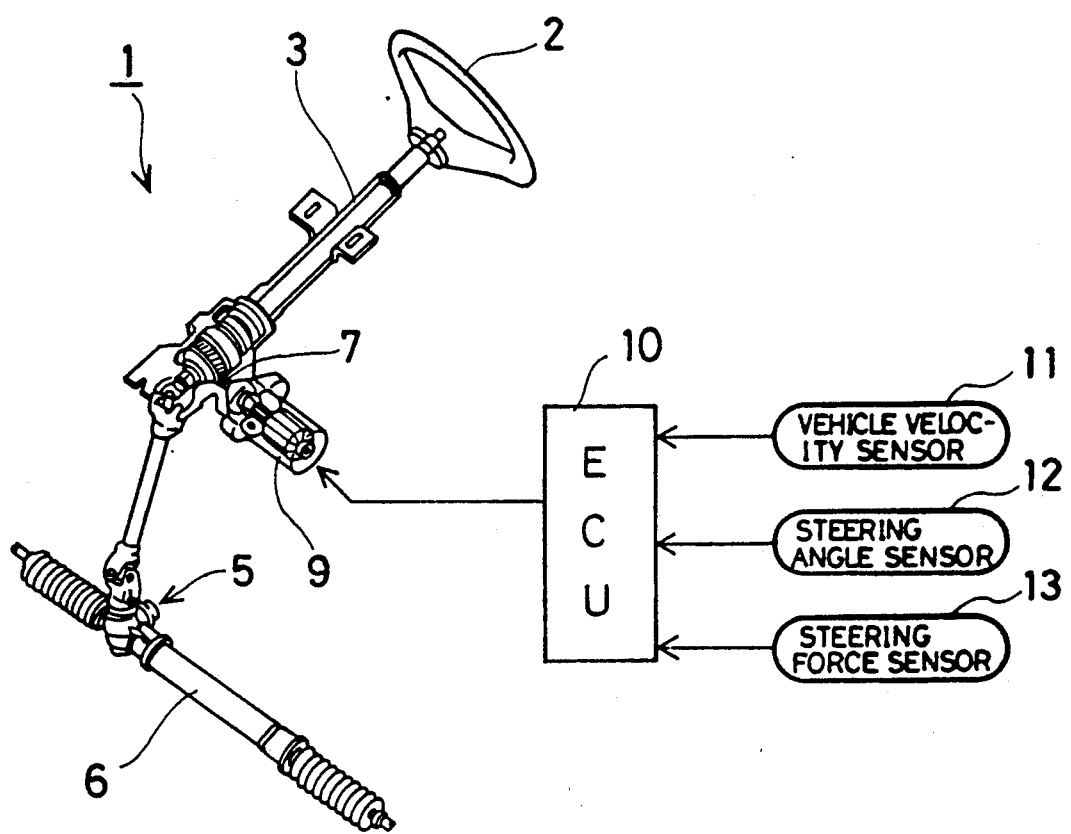

With reference to FIG. 1, numeral 1 denotes a power steering system in which rotation of a steering wheel 2 is transmitted to a steering gear 5 via a steering shaft 3. The steering gear 5 drives a steering rack 6 to the left and right to steer the vehicle equipped with the system. The rotation of a steering motor 9 is transmitted to the steering shaft 3 via a worm gear 7. An electronic control unit 10 is programmed to process signals from a vehicle velocity sensor 11, a steering angle sensor 12 and a steering force sensor 13, and to deliver a control signal, which is based on the results of processing, to the steering motor 9. The steering angle sensor 12 senses the angle of rotation of steering shaft 3, and the steering force sensor 13 senses the torsion angle of a torsion bar provided on the steering shaft 3.

Figure 2:
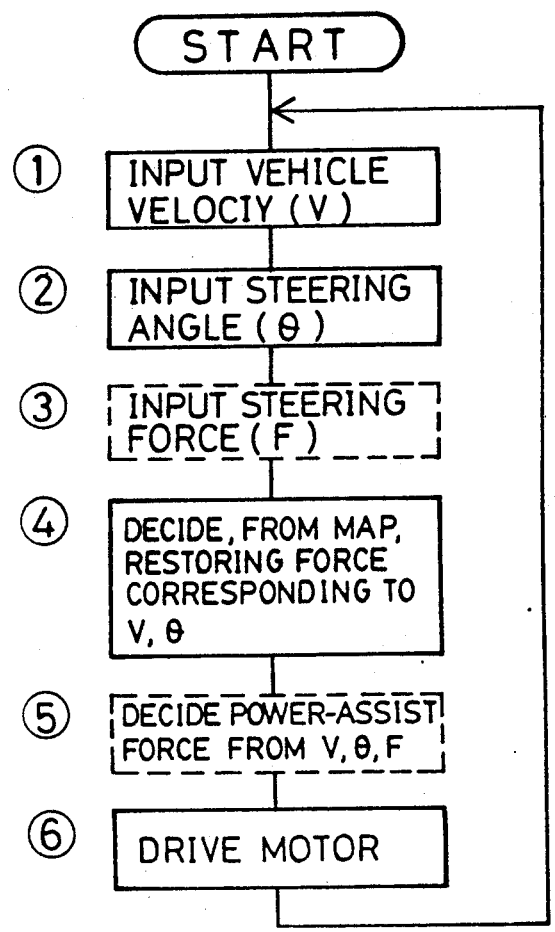
Figure 3:
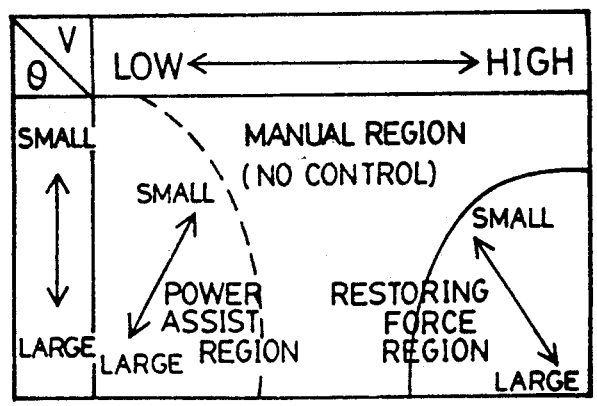

As shown in the flowchart of FIG. 2, values of vehicle velocity V, steering angle θ and steering force F are inputted to the electronic control unit 10 at steps (1), (2) and (3), respectively. At step (4), the electronic control unit 10 decides a restoring force commensurate with the velocity V and steering angle θ, these being determined from a map shown in FIG. 3. This is followed by step (5), at which the electronic control unit 10 decides a power-assist force commensurate with the velocity V, steering angle θ and steering force F. The steering motor 9 is driven at step (6). The steering shaft 3 is rotated in the same direction as the steering wheel 2 when the power-assist force is applied, and in the opposite direction when the restoring force is applied. If the power-assist force is unnecessary, as is the case in, say, a compact car, the processing of steps (3) and (5) in the flowchart may be deleted. Though the restoring force is decided upon estimating centrifugal force from the vehicle velocity V and steering angle θ in the present embodiment, it is permissible to decide the restoring force based solely upon the vehicle velocity.

Figure 4:
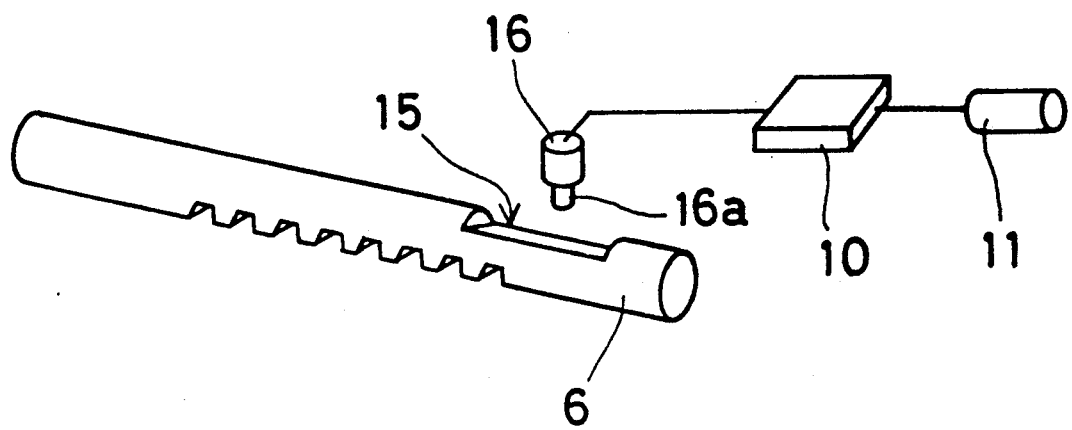
FIGS. 4 and 5 are views illustrating other embodiments of a steering safety mechanism according to the present invention.
Figure 5:
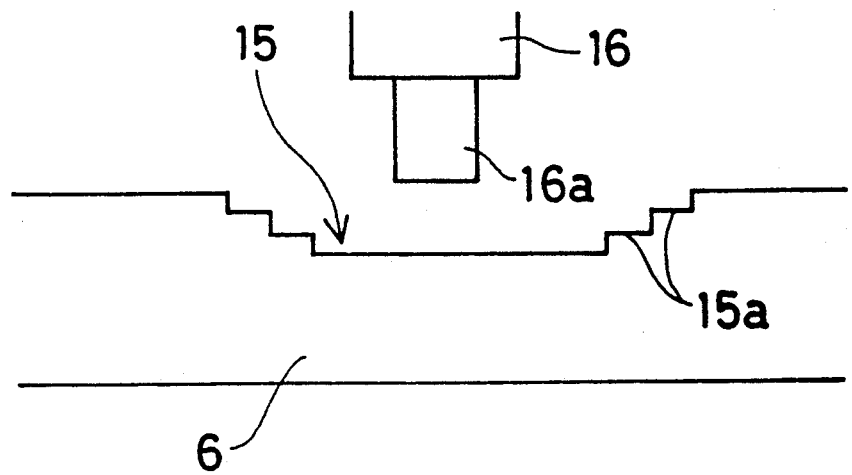

FIGS. 4 and 5 illustrate another embodiment of the present invention.

In the embodiment of FIG. 4, the steering rack 6 is provided with a recess 15, and a solenoid 16 having a plunger 16a is arranged to oppose the recess 15. When the velocity sensor 11 senses that vehicle velocity is above a predetermined value, the sensor 11 provides the electronic control unit 10 with a signal to this effect. The control unit 10 responds by energizing the solenoid 16, the latter responding by thrusting its plunger 16a forward. Accordingly, when the steering rack 6 slides, the plunger 16a strikes one end of the recess 15, thereby limiting steerability to the range defined by the recess 15. Alternatively, it is possible to adopt an arrangement in which the plunger 16a of solenoid 16 is thrust forward when the solenoid 16 is deenergized. This would enable steering to be restricted in the event of a failure, such as burn-out of solenoid 16. In another possible arrangement, projections can be formed on the steering rack 6 instead of the recess 15.

In FIG. 5, which shows a modification of the above embodiment, the ends of the recess 15 of steering rack 6 are formed to have steps 15a. Here the output delivered to the solenoid 16 from the electronic control unit 10 is varied as a function of vehicle velocity, thereby controlling the projecting length of the plunger 16a. Since the step that will be contacted by the plunger 16a will depend upon its projecting length, this arrangement makes it possible to vary the range over which steering is restricted.

Figure 6:
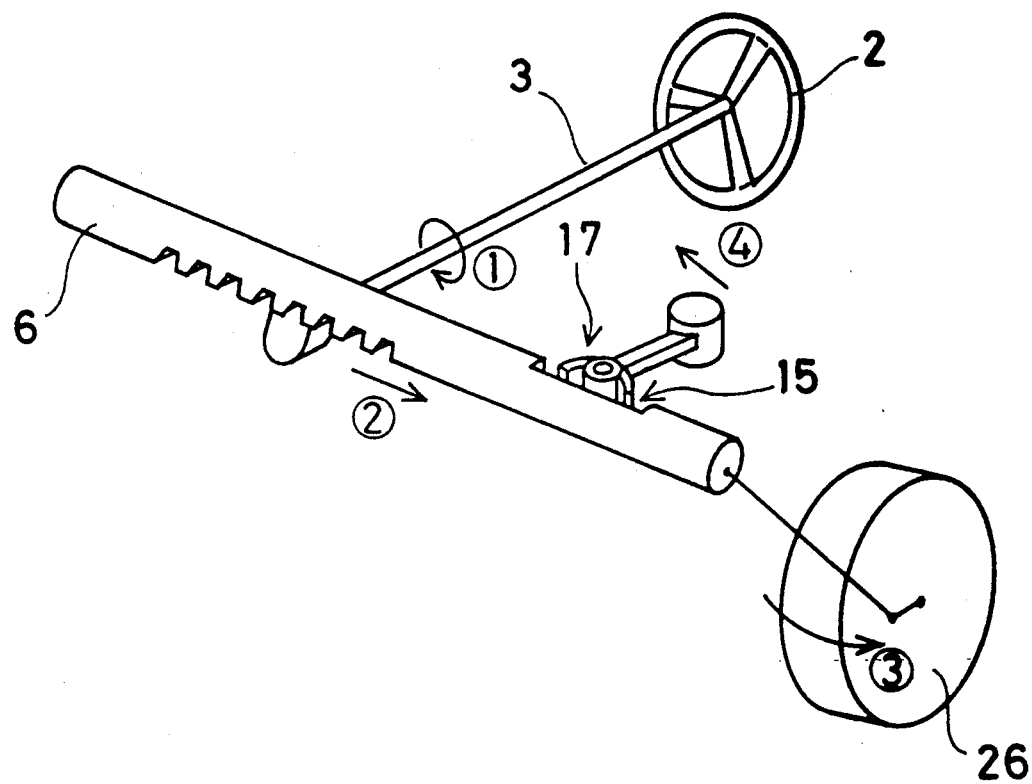
FIGS. 6, 7 and 8 are views illustrating further embodiments of a steering safety mechanism according to the present invention.
Figure 7:
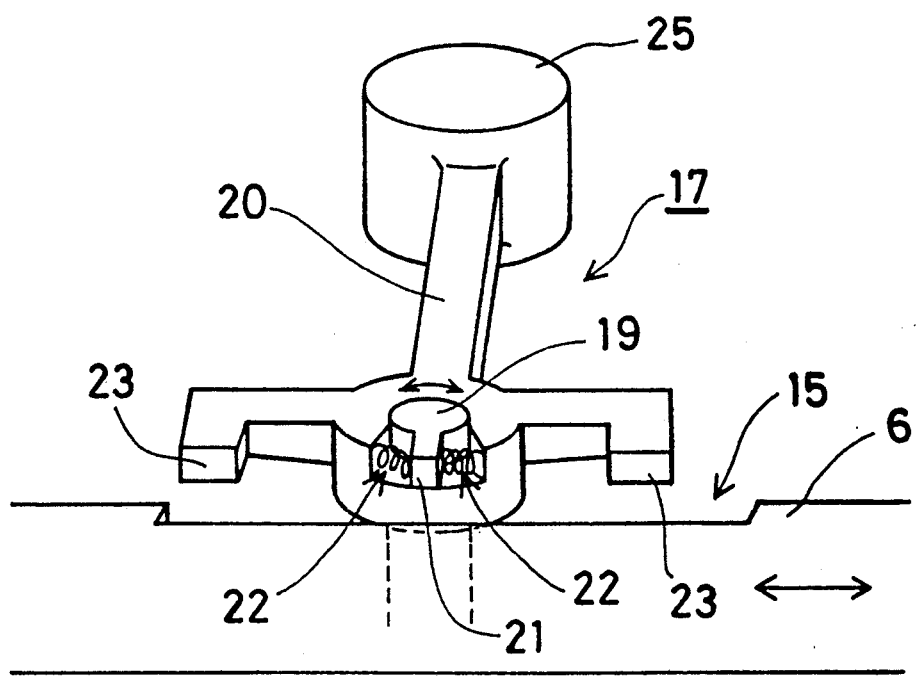
Figure 8:
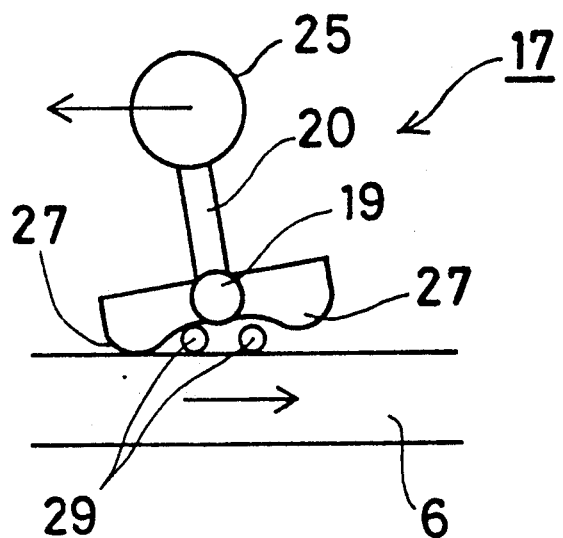
Figure 8:
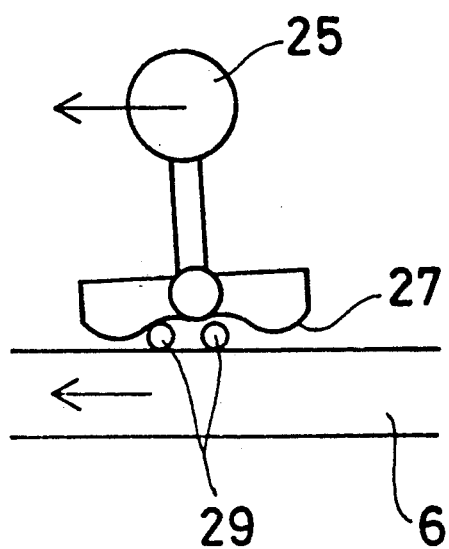

FIGS. 6 through 8 illustrate still another embodiment of the invention.

Whereas the embodiment of FIG. 4 provides the solenoid 16 so as to oppose the recess 15 of steering rack 6 and performs control electrically by energizing and deenergizing the solenoid, the embodiment of FIG. 6 disposes a limiting mechanism 17 in opposition to the recess 15 and actuates this mechanism mechanically to achieve control. As shown in FIG. 7, a support shaft 19 is fixedly secured to the vehicle body or to a rack cover secured to the vehicle body, and a rocking lever 20 is rockably fitted on the support shaft 19. A projection 21 is formed on the support shaft 19, and springs 22 for biasing the rocking lever 20 are provided on the left and right sides of the projection 21. Engaging pieces 23 are formed on one end of the rocking lever 20 on both sides of the support shaft 19, and a weight 25 is formed on the other end of the rocking lever 20.

In operation, the weight 25 is kept perpendicular to the steering rack 6 by the springs 22 in the absence of a centrifugal force acting upon the vehicle body. As a result, the engaging pieces 23 of the rocking lever 20 are held substantially equidistant from the steering rack 6 and are located outside the recess 15, thereby allowing the rack 6 to move freely for unrestricted steering. If the steering wheel 2 is now turned to the left to rotate the steering shaft 3 in the direction of arrow (1), as shown in FIG. 6, the steering rack 6 is slid in the direction of arrow (2) and turns a tire 26 in the direction of arrow (3). At this time the weight 25 swings in the direction of arrow (4) in dependence upon vehicle velocity and steering angle, so that one of the engaging pieces 23 of rocking lever 20 enters the recess 15 of rack 6. As a consequence, this engaging piece 23 comes into abutting contact with one end of the recess 15 so that steerability is limited to the range of the recess irrespective of efforts to turn the steering wheel 2 further. If the steering wheel 2 is turned to the right, the directions of movement of the various components will be opposite to those indicated by the arrows.

It is possible here also to provide the recess 15 with steps just as in the embodiment of FIG. 5 so that the steering limits can be varied in accordance with centrifugal force.

FIG. 8 illustrates another example of the limiting mechanism 17. This arrangement differs from that of FIG. 7 in that the engaging pieces 23 are formed to have curved surfaces 27, and rollers 29 are disposed between the limiting mechanism 17 and the steering rack 6. When a centrifugal force acts upon the weight 25, as shown in (a) of FIG. 8, there is an increase in the frictional force between one of the curved surfaces 27 and the steering rack 6. This results in application of a restraining force that attempts to stop movement of the steering rack 6, thereby restricting steering. When the steering rack 6 attempts to return to its original position, however, the restraining force is overcome by the rolling action of the rollers 29.

As many apparently widely different embodiments of the present invention can be made without departing from the spirit and scope thereof, it is to be understood that the invention is not limited to the specific embodiments thereof except as defined in the appended claims.

We claim:

1. A steering safety mechanism for an automotive vehicle, comprising:
   a steering shaft and a steering wheel connected to said steering shaft for turning said steering shaft;
   a steering rack connected to a ground-engaging wheel for turning said ground engaging wheel responsive to the turning of the steering shaft;
   steering limiting means for mechanically engaging said rack to prevent further rotation of said steering shaft in one direction while permitting rotation of said steering shaft in the opposite direction; and
   steering limiting control means for selectively activating said steering limiting means to mechanically engage said steering rack responsive to vehicle velocity.

2. A steering safety mechanism in accordance with claim 1 further comprising engaging means formed on said rack;
   wherein said steering limiting means comprises:
   a rocking lever freely rotatably fitted on a support shaft;
   springs provided between said support shaft and said rocking lever;
   an engaging member provided on said rocking lever and engageable with said engaging means; and
   a weight provided on said rocking lever.

3. The mechanism according to claim 2, wherein said engaging means is a recess or projections formed on said steering rack, said recess or said projections being formed to have step portions.

4. A steering safety mechanism in accordance with claim 1 wherein said steering limiting means comprises:
- a rocking lever freely rotatably fitted on a support shaft;
- springs provided between said support shaft and said rocking lever;
- an engaging member provided on said rocking lever and contactable with said steering rack;
- a weight provided on said rocking lever; and
- rollers provided between said steering rack and said limiting mechanism.

5. A steering safety mechanism in accordance with claim 1 wherein said steering limiting control means selectively activates said steering limiting means responsive to vehicle velocity and steering angle.

6. A steering safety mechanism according to claim 1 wherein said steering limiting means comprises:
- a steering motor; and
- a worm gear connecting said motor to said steering shaft; and wherein said steering limiting control means further comprises:
- an electronic control unit for delivering a control signal to said motor in dependence upon vehicle velocity.

7. A steering safety mechanism according to claim 6, wherein said control unit comprises:
- means establishing a limited region of values for vehicle velocity and steering angle; and
- decision means for deciding if input values for vehicle velocity and steering angle fall within said limited region and, if said input values do fall within said limited region, delivering said control signal to said motor.

8. A steering safety mechanism according to claim 7, wherein said limited region includes a restoring force region wherein said control signal is delivered to the motor to apply a motor force to said steering shaft in a direction opposite to force applied through the steering wheel.

9. A steering safety mechanism according to claim 7, wherein said recess is delimited by shoulder abutments at opposite ends thereof.

10. A steering safety mechanism according to claim 6, wherein said control unit comprises:
- means for establishing power assist, restoring force and no control regions of values for vehicle velocity and steering angle; and
- decision means for deciding which of said regions input values for vehicle velocity and steering angle fall into and, if determined to fall into said power assist region, delivering a control signal to said motor for power assist and, if determined to fall into said restoring force region, delivering a control signal to said motor for restoring force.

11. A steering safety mechanism according to claim 1, wherein said limiting means comprises:
- a recess provided in the rack, and
- a solenoid with a plunger for selectively engaging the plunger in the recess; and wherein
- said limiting control means comprises an electronic control unit for delivering said control signal to said solenoid.

12. A steering safety mechanism according to claim 1, wherein said limiting means comprises:
- a recess having two opposing ends provided in the rack;
- engaging means for selectively engaging one of said two ends of the recess; and wherein said limiting control means comprises:
- a weight mounted for swinging movement responsive to vehicle velocity and steering angle,
- a rocking lever connecting said weight and said engaging means; and
- biasing means for biasing said lever toward a rest position perpendicular to the rack.

13. A steering safety mechanism according to claim 1, wherein said limiting means comprises:
- engaging means, having a curved surface, for selectively engaging with the rack surface; and wherein said limiting control means comprises:
- a weight mounted for swinging motion responsive to vehicle velocity and steering angle;
- a rocking lever connecting said weight with said engaging means; and
- rolling means provided between said engaging means and said rack, for urging said lever toward a rest position perpendicular to the rack.

14. A steering safety mechanism according to claim 13, wherein:
- said rolling means comprises two rollers provided between said curved surface and said rack.

15. A steering safety mechanism for an automotive vehicle, comprising:
- a steering shaft;
- a steering rack for turning a tire in response to rotation of said steering shaft;
- engaging mean formed on said rack;
- a solenoid having a plunger engageable with said engaging means;
- and an electronic control unit for controlling said solenoid;
- said solenoid being controlled to limit movement of said steering rack in dependence upon vehicle velocity and steering angle, or vehicle velocity alone.

* * * * *